US011676139B2

(12) United States Patent
Mao et al.

(10) Patent No.: US 11,676,139 B2
(45) Date of Patent: Jun. 13, 2023

(54) BLOCKCHAIN ADAPTER, PROTOCOL, AND ACCESS LAYER

(71) Applicant: ArcBlock, Inc., Bellevue, WA (US)

(72) Inventors: Zhihong Mao, Issaquah, WA (US);
Peiling Ding, Redmond, WA (US);
Tian Chen, Issaquah, WA (US)

(73) Assignee: ArcBlock, Inc., Bellevue, WA (US)

( * ) Notice: Subject to any disclaimer, the term of this patent is extended or adjusted under 35 U.S.C. 154(b) by 381 days.

(21) Appl. No.: 16/453,760

(22) Filed: Jun. 26, 2019

(65) Prior Publication Data
US 2020/0005292 A1 Jan. 2, 2020

Related U.S. Application Data

(60) Provisional application No. 62/692,419, filed on Jun. 29, 2018.

(51) Int. Cl.
*G06Q 20/38* (2012.01)
*G06Q 20/40* (2012.01)
(Continued)

(52) U.S. Cl.
CPC ..... *G06Q 20/3825* (2013.01); *G06F 16/1824* (2019.01); *G06Q 20/065* (2013.01);
(Continued)

(58) Field of Classification Search
CPC ............. G06Q 20/3825; G06Q 20/401; G06Q 20/065; G06Q 2220/00; G06Q 20/223;
(Continued)

(56) References Cited

U.S. PATENT DOCUMENTS 9,753,744 B1 9/2017 Wells et al.
9,882,715 B2 * 1/2018 Alness ............... G06Q 20/3823
(Continued)

FOREIGN PATENT DOCUMENTS

EP 3561710 A1 * 10/2019 ............. G06Q 40/02
WO 2017187396 A1 11/2017

OTHER PUBLICATIONS

International Search Report and Written Opinion, dated Oct. 17, 2019, International Patent Application No. PCT/US2019/039335, filed Jun. 26, 2019, 8 pages.

*Primary Examiner* — Patrick McAtee
*Assistant Examiner* — Vincent I Idiake
(74) *Attorney, Agent, or Firm* — Eversheds Sutherland (US) LLP (57) ABSTRACT

Techniques and systems described below relate to systems and methods to access and store blockchain data. In various examples, a client computer system submits a blockchain-agnostic request to a computing resource service provider and the service provider processes the request. The chain-agnostic request may be a request that is interoperable between multiple blockchain protocols, such that, for a given request, the request can be fulfilled using multiple underlying blockchain technologies. A computing resource service provider may receive and process chain-agnostic requests by decoding or otherwise interpreting the requests and routing the requests for fulfillment using one or more chain adapters that are accessible to the computing resource service provider. The service provider may determine metadata associated with the request and determining how to fulfill the request, which may include accessing computing resources of the computing resource service provider and/or the associated blockchain network.

12 Claims, 5 Drawing Sheets

(51) Int. Cl.
  *H04L 9/06*     (2006.01)
  *H04L 9/14*     (2006.01)
  *G06Q 20/06*    (2012.01)
  *G06F 16/182*   (2019.01)

(52) U.S. Cl.
  CPC ......... *G06Q 20/401* (2013.01); *H04L 9/0643*
    (2013.01); *H04L 9/14* (2013.01)

(58) Field of Classification Search
  CPC ......... G06Q 20/02; H04L 9/0643; H04L 9/14;
      H04L 2209/38; H04L 9/3239; H04L
      9/3247; G06F 16/1824; G06F 16/258
  See application file for complete search history.

(56)           References Cited

U.S. PATENT DOCUMENTS

| | | | |
|---|---|---|---|
| 10,354,325 B1* | 7/2019 | Skala | G06Q 20/065 |
| 2017/0091726 A1* | 3/2017 | Morgan | G06Q 20/065 |
| 2017/0154331 A1 | 6/2017 | Voorhees | |
| 2017/0236103 A1 | 8/2017 | Biton | |
| 2018/0082024 A1 | 3/2018 | Curbera et al. | |
| 2019/0065593 A1* | 2/2019 | Barski | G06F 16/95 |
| 2019/0130391 A1* | 5/2019 | Wright | G06F 21/645 |
| 2019/0347658 A1* | 11/2019 | Haimes | G06Q 20/04 |
| 2021/0014320 A1* | 1/2021 | Opsenica | H04L 12/4641 |

* cited by examiner

BLOCKCHAIN ADAPTER, PROTOCOL, AND ACCESS LAYER

CROSS REFERENCE TO RELATED APPLICATION

This application claims priority to U.S. Provisional Patent Application No. 62/692,419, filed on Jun. 29, 2018, entitled "BLOCKCHAIN ADAPTER, PROTOCOL, AND ACCESS LAYER", the disclosure of which is hereby incorporated herein by reference in its entirety for all purposes.

BACKGROUND

Adoption of blockchain technologies in various contexts is challenging. There are many challenges that software developers and organizations face to create widespread, decentralized blockchain applications. Among them include, but are not limited to, poor performance and requirements for deeply specialized knowledge to create blockchain-based applications.

As discussed above, performance is one of the main challenges facing existing blockchain technologies. Existing blockchains such as Bitcoin are designed to handle small numbers of transactions—for example, Bitcoin is designed to handle seven transactions per second. Many applications have requirements and/or expectations to handle much higher throughputs, and some applications may not be practical or usable without large numbers of concurrent users, which existing blockchains such as Bitcoin may not be able to support. For example, some applications may require reliable feedback with only sub second delays. Longer delays may frustrate users and make blockchain-based applications less competitive as compared to non-blockchain alternatives.

Existing blockchain applications are built for specialized software developers, creating a barrier to widespread adoption of blockchain technologies. Nearly all blockchain applications require users to run a blockchain node or install a "light node." Additionally, there may be a steep learning curve for a user to learn how the intricacies of a blockchain. Compounding this problem is the adoption of multiple differing blockchain technologies, making it even more difficult for a user to build blockchain-based applications that are interoperable across multiple blockchain technologies.

BRIEF DESCRIPTION OF THE DRAWINGS

Various techniques will be described with reference to the drawings, in which.

DETAILED DESCRIPTION

Techniques and systems described below relate to systems and methods to access and store blockchain data. In various examples, a client computer system (e.g., an application running on the client computer system) submits a blockchain-agnostic request to a computing resource service provider and the service provider processes the request. The chain-agnostic request may be a request that is interoperable between multiple blockchain protocols, such that, for a given request, the request can be fulfilled using multiple underlying blockchain technologies. For example, a chain-agnostic request to access data from a first blockchain network may be implemented and fulfilled using a first chain adapter that accesses data for the request according to the rules and protocols for the first blockchain, and a request in the same format (e.g., differing only in that a different blockchain is specified in the request) can be fulfilled using a second chain adapter that accesses data for the request according to rules and protocols for the second, different, blockchain. Furthermore, a client making the chain-agnostic requests may make the requests according to a query language that is not specifically tied to any specific blockchain protocol, and the client does not need to run or provision software specifically for to support any blockchain protocol—for example, a client that submits a chain-agnostic request to access data from the Bitcoin network does not need to run a Bitcoin full node. A computing resource service provider may receive and process chain-agnostic requests by decoding or otherwise interpreting the requests and routing the requests for fulfillment using one or more chain adapters that are accessible to the computing resource service provider. The service provider may receive the request via a web application programming interface (API), parse the request to determine metadata associated with the request, such as identifying a particular blockchain network that the request is associated with, and determining how to fulfill the request, which may include accessing computing resources of the computing resource service provider and/or the associated blockchain network. Chain adapters may be created, operated, and/or controlled by the computing resource service provider but such need not be the case—in various embodiments, a third-party computing entity creates and/or runs a chain adapter that can be used to fulfill chain-agnostic requests according to one or more interfaces.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
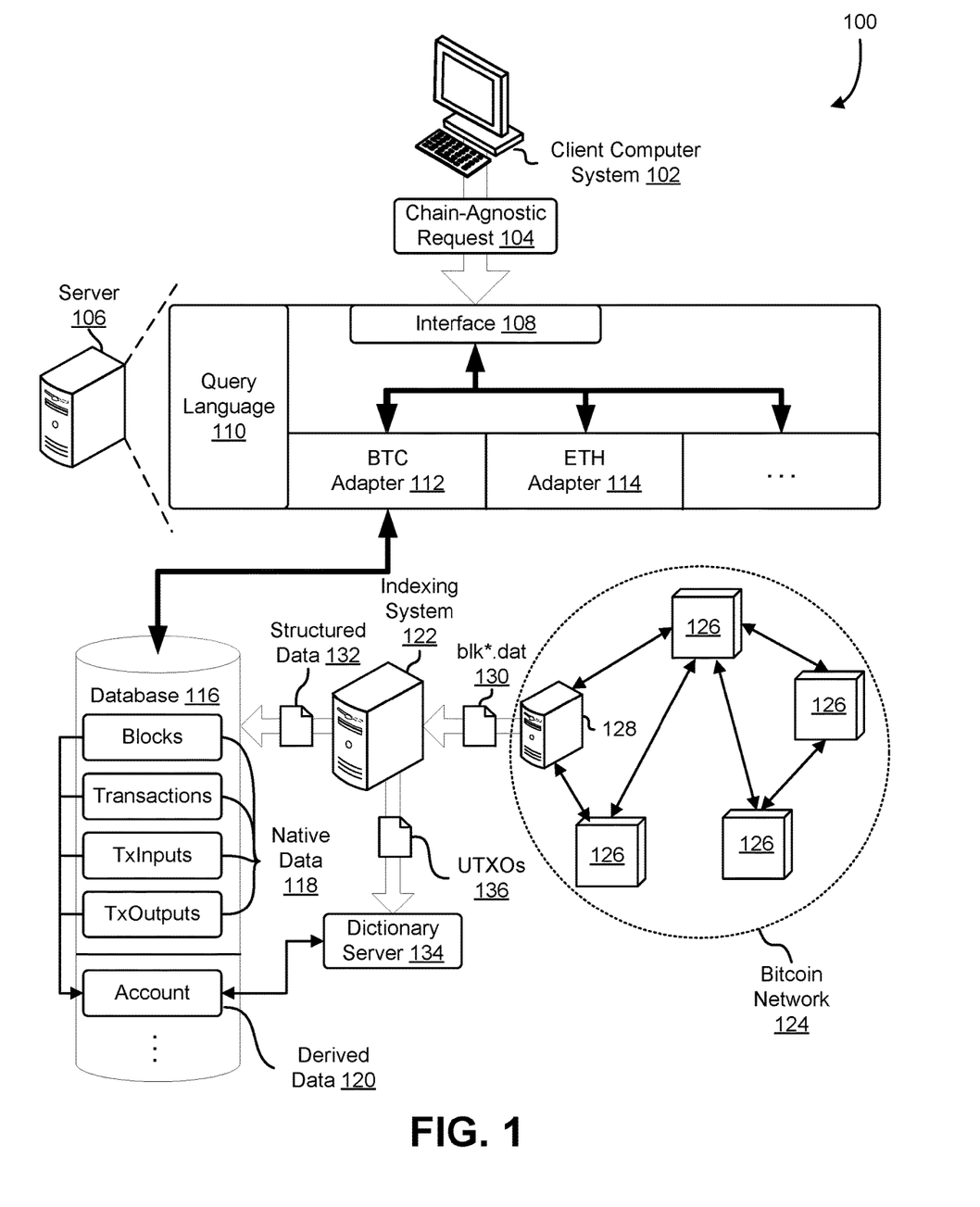
FIG. 1 illustrates an example of a computing environment, in accordance with an embodiment.

FIG. 1 illustrates a computing environment 100 in which an embodiment may be practiced. The computing environment 100 may be used to implement a system that supports access to various blockchains and blockchain protocols. A client computer system 102 may submit chain-agnostic requests 104 to a computing resource service provider (e.g., request may be received by a server 106 of the computing resource service provider) via an interface 108 and the server 106 processes the request according to various blockchain protocols. The chain-agnostic request may be submitted according to query language 110 such as GraphQL that is not tied to a specific blockchain protocol. In an embodiment, a client computer system 102 submits a request that is blockchain-agnostic (e.g., request format is not dependent on the particular blockchain being accessed) and the server 106 selects a corresponding adapter to utilize in fulfilling the request. The service provider may fulfill the request using one or more computing resources such as backend servers, computing hardware and/or software, and blockchain resources. In various embodiments, the computing resource service provider includes backend servers that provide computing resources such as compute resources (e.g., processing units), memory, data storage, bus interfaces, network interfaces, and more. Additionally, the computing resource service provider may utilize computing resources to operate within the context of a blockchain network—for example, the computing resource server provider may allocate computing resources (e.g., storage and/or compute resources) to run a full node of a blockchain (e.g., Bitcoin) network.

In an embodiment, the computing resource service provider implements or otherwise supports a set of adapters for interfacing with a set blockchain networks. The adapters may be utilized as part of fulfilling chain-agnostic requests. For example, if a chain-agnostic request is a request to read data from the Bitcoin ledger, the BTC Adapter 112 may be utilized. As a second example, if a chain-agnostic request indicates a request to write to the Ethereum blockchain, the ETH adapter 114 may be utilized in connection with the write request. These are merely illustrative examples of different types of blockchains that adapters may be implemented for, and in various embodiments, other blockchain adapters are supported by the service provider. Chain adapters are described in greater detail below.

Various computing resources may be utilized to support an adapter for a blockchain. For example, FIG. 1 illustrates various components that are included in an adapter for a Bitcoin-based blockchain protocol, in accordance with at least one embodiment. Computing resources such as databases, computer servers (e.g., physical and/or virtual computer systems), networking components, and more may be utilized to implement an adapter. As illustrated in FIG. 1 and in accordance with at least one embodiment, a Bitcoin adapter may be implemented at least in part by a database 116 that stores native data 118 and derived data 120. Native data 118 may refer to data that is obtained directly from an external source, and may be in contrast to derived data 120 which, in an embodiment, refers to data that is derived from other sources, such as the native data 118 stored in the database 116. An indexing system 122 may be hardware and/or software that obtains data from a blockchain network (e.g., Bitcoin network 124 illustrated in FIG. 1) and manages the storage of the data to the database 116.

In an embodiment, a blockchain network (e.g., Bitcoin network 124) is comprised of a set of nodes (e.g., remote nodes 126 that may be controlled by separate entities in a distributed computing environment) and a local node 128. The local node 128 illustrated in FIG. 1 is implemented, in an embodiment, using computing resources of the computing resource service provider, and is a full node of the Bitcoin ledger that includes a copy of the blockchain ledger. Data from the blockchain may be referred to as raw data, as it is in a format that is not easy to visualize, index, search, filter, and aggregate.

The indexing system 122 illustrated in FIG. 1, in an embodiment, obtains raw data (e.g., data from a blk*.dat file 130) from the local node 128 and converts it to structured data 132 that is stored in a database 116. The structured data 132 may be stored in one or more database tables organized in rows and columns, and may be indexed according to various properties to facilitate different types of data access such as aggregation and filtering. Additionally, some set of data may also be stored in a high-performance dictionary server 134. For example, the balance of a particular user's wallet may change frequently and can be calculated by storing the set of all unspent transaction outputs (UTXOs 136) to the dictionary server 134, filtering the dictionary server to find all UTXOs that have been sent to a particular user, and summing the value of those UTXOs to determine the particular user's wallet balance. Data from the dictionary server 134 may serve as the data source for data stored in the database (e.g., users' wallet balances may be calculated based on the UTXOs stored in the dictionary server and the determined balances stored in the database).

Generally speaking, while an adapter for a Bitcoin-based blockchain network is described in detail in connection with FIG. 1, adapters for various other types of blockchain networks can utilize techniques described in connection with this disclosure to implement various types of chain adapters. For example, an Ethereum-based adapter may be implemented using techniques described in connection with FIGS. 1 and 3.

The client computer system 102 illustrated in FIG. 1 may be any suitable computing device such as a desktop computer, server computer, laptop, mobile device, embedded device, and more. The client computer system 102 may include a client SDK or software library that includes executable code that one or more processors of the client computer system can utilize to implement support for various functionality that is exposed through an interface of a computing resource service provider. In some embodiments, the client computer system 102 does not necessarily need to be a node of any blockchain network and, to interact with a blockchain, submits a web API request to the computing resource service provider according to a specified interface 108. The interface 108 may support various types of requests to read, write, and access data for one or more blockchains. In an embodiment, the client 102 submits a web-API request to the computing resource service provider by generating a request according to a high-level structured language format, such as GraphQL, Extensible Markup Language (XML), JavaScript Object Notation (JSON), and more. The request may be a chain-agnostic request 104.

In an embodiment, a chain-agnostic request 104 is a request that encoded in a format that is not dependent on the syntax or protocol of a specific blockchain. For example, the chain-agnostic request may be a GraphQL request that includes a parameter that indicates the request is a request to read data from a particular blockchain. The request may include additional parameters that can be used to search, filter, and aggregate data from the source chain. For example, data relating to UTXOs associated with a particular user account may be aggregated to fulfill a request that queries the wallet balance for the particular user. A chain-agnostic request may refer to a request that is interoperable between different blockchains or different types of blockchains so that, in an embodiment, a web API request that is submitted via a chain-agnostic request can be processed for different blockchains. The chain-agnostic request 104 may be transmitted by the client to a server (e.g., the server 106 illustrated in FIG. 1) over any suitable network, including an intranet, the Internet, a cellular network, a local area network, a satellite network or any other network, and/or combination thereof.

The server 106 illustrated in FIG. 1 may refer to one or more computing resources that implement a frontend server of a computing resource service provider. The server 106 may be implemented using hardware, software, and a combination thereof. The server 106 may implement the server-side of a client-server relationship in which the server 106 is able to receive, via chain-agnostic requests via an interface 108 and process the requests. In an embodiment, the interface 108 refers to a high-level, generic APIs that enable open connectivity and access to a range of blockchain protocols. The interface 108 may be implemented by the server 106 that utilizes various blockchain adapters to fulfill requests.

In an embodiment, the server 106 supports multiple interfaces. A first interface (which may also be referred to as a common chain API) may refer to a set of foundational API commands that are required to be supported by all chain adapters. The server 106 may additionally support a second interface (referred to as a common chain data API) that enables access to blockchain data and treats each blockchain as a finite state machine. A Chain Adapter must support all of the APIs included in this level. However, they may implement a different capacity set. Thirdly, a third interface may be referred to as native chain APIs which are a set of APIs that expose native features of blockchain protocols. While support of native chain APIs may be optional, in various embodiments, clients may benefit from improved performance by using native blockchain features. In various embodiments, a client (e.g., client computer system 102) can query the server 106 to determine which set of APIs are supported by the server 106 for a particular chain adapter.

As illustrated in FIG. 1, the computing resource service provider may support multiple chain adapters such as a Bitcoin-based adapter 112, an Ethereum-based adapter 114, and more. In an embodiment, a blockchain may have native support for an interface or multiple interfaces, in which case an adapter for such a blockchain may be a lightweight adapter that routes the client request to the appropriate blockchain. In an embodiment, the adapter is a wrapper that maps a client API request (e.g., the blockchain agnostic API request) to a blockchain command. The interface 108 may be a HTTP-based RESTful API (representational state transfer).

In an embodiment, the server 106 and chain adapters process requests that are made in a query language 110. The query language may refer to a high-level structured language format, such as GraphQL, Extensible Markup Language (XML), JavaScript Object Notation (JSON), and more. In an embodiment, the query language allows the client to specify the structure in which data is to be provided in response to a request.

One or more chain adapters—such as the Bitcoin-based adapter 112 and Ethereum-based adapter 114 illustrated in FIG. 1—may be supported. In an embodiment, the chain-agnostic request 104 specifies a particular blockchain as part of the request and the request is routed to the chain adapter associated with the specified blockchain. Chain adapters may be implemented using hardware, software, and a combination thereof. In an embodiment, the server 106 processes the request by deconstructing the request and determining which chain adapter to use to fulfill the request, which may be based on the chain, the type of request (e.g., based on whether a particular adapter supports the request), and more.

In some embodiments, a chain adapter is implemented separately from the server 106—for example, the server 106 includes code that identifies a corresponding chain adapter to fulfill the request with and then forwards the chain-agnostic request (or a request derived thereof) to the appropriate chain adapter. In an embodiment, the chain adapter is implemented by a third-party entity (e.g., server is implemented and controlled by a first organization and chain adapters are implemented and controlled by a different organization).

A Bitcoin-based adapter 112 is implemented using computing resources of a computing resource service provider, in accordance with at least one embodiment. In an embodiment, a Bitcoin-based adapter 112 is implemented using computing resources such as a compute resources (e.g., the local node 128), database-related resources, and more. In an embodiment, requests to access data from the Bitcoin network are processed by translating the chain-agnostic request to a database request (e.g., translating a GraphQL query to a SQL database query). Various techniques may be employed to provision and maintain the database 116, as described hereinbelow.

The database 116 may refer to a database storage system of a relational database management system that stores data in a structured, relational format (e.g., as tables of a database that can be indexed and searched upon) and includes a query processor that can be used to determine an execution plan. The query processor may be utilized to determine an optimized or partially-optimized execution plan. In an embodiment, the database 116 comprises a plurality of database tables that store rows (also referred to as records) of data that are organized in columns (also referred to as properties). The database may refer to a SQL server.

In an embodiment, the database 116 is populated with native data 118 and derived data 120. Native data 118, in an embodiment, refers to data that is obtained directly from raw data. The raw data, in this case, may refer to the blockchain ledger or a portion thereof. In this context, obtaining data directly from the raw data may include serializing and extracting portions of the blk*.dat file raw file, mapping (e.g., based on the format of the raw data according to the blockchain protocol) the portion of the raw data to a property of a database table. In an embodiment, native data is stored in a set of database table wherein the set of database tables can be determined based on the blockchain ledger and, conversely, the blockchain ledger can be determined based on the set of database tables. In an embodiment, the database 116 stores native data 118 in four tables: a Block table that stores block-level properties such as the block height, Merkle tree and Merkle root information usable to verify the integrity of the block, the number of transactions included in the block, etc., a Transaction table that stores transaction-related properties such as a reference to the block that the transaction is included in, the value of the transaction, fees paid out in the transaction, a TxInputs table that stores properties related to transaction inputs such as the transaction the input is associated with, value paid by the transaction input, the locking script, and the account information of the account funding the transaction, and a TxOutputs table that stores properties related to transaction outputs such as the transaction the output is associated with, value received by the transaction output, the unlocking script, and account information of the account receiving the funds.

In an embodiment, derived data 120 refers to database tables whose quantities are derived from other database tables (e.g., not obtained directly from the blockchain ledger) and/or refer to database tables that are not required to form the inverse relationship described above. For example, an Accounts table may include information related to a particular user or identity of a blockchain. The database tables illustrated in FIG. 1 may be in accordance with those described in connection with FIG. 4.

The indexing system 122 may refer to hardware, software, or a combination thereof that translates raw data obtained from the local node 128 and converts the data to structured data 132 that is stored in the database 116. In an embodiment, the indexing system is implemented using one or more computer servers that have access to a local node 128 (e.g., access to read data), the local node either storing or having access to the blockchain ledger. The indexing system includes executable code that, if executed by one or more processors, causes the one or more processors to access the blockchain ledger, deconstruct the raw data into constituent parts, and store the constituent parts as structured data 132 in a database 116. Generally speaking, any suitable structured data store may be utilized to store the structured data 132. In an embodiment, the indexing system may also provide some or all of the raw data to a dictionary server 134 for fast lookups. For example, the indexing system 122 may provide all unspent transaction outputs 136 (UTXOs) to the dictionary server 134 (as well as updates when UTXOs have been spent) to allow the dictionary server 134 to keep a rolling history of users' wallet balances.

The dictionary server 134 may refer to a remote dictionary server that is a data structure server that can be used as a database, cache, and message broker. The dictionary server 134 may support various types of data structures and can be used to implement an in-memory key-value store that can be used to perform low-latency, high-performance operations on large sets of data. For example, the dictionary server 134 may be include a table of all unspent transaction outputs that include a key-value pair of the recipient address of the UTXO and the value of the UTXO. In this manner, the dictionary server 134 is able to efficiently determine the sum of a particular user's wallet by filtering on all key-value pairs having the particular user's address and adding together the unspent transaction outputs to determine the total wallet value. Dynamic programming techniques may be utilized to improve the performance of various types of requests, such as those described above. In an embodiment, the dictionary server 134 is implemented using Redis, an in-memory remote database.

The Bitcoin network 124 illustrates an example blockchain network associated with a blockchain in accordance with an embodiment of the present disclosure. In the embodiment, the example blockchain network is comprised of peer-to-peer distributed electronic devices running an instance of the blockchain protocol. In some examples, the distributed electronic devices are referred to as nodes. An example of a blockchain protocol is a Bitcoin protocol.

FIG. 1 illustrates, in accordance with at least one embodiment, several remote nodes 126 and a local node 128. The nodes may be comprised of any suitable computing device (e.g., by a server in a data centre), by a client computing device (e.g., a desktop computer, laptop computer, tablet computer, smartphone, etc.), by multiple computing devices in a distributed system of a computing resource service provider, or by any suitable electronic client device such as the computing device 500 of FIG. 5. The local node 128, in an embodiment, refers to a node of the blockchain network that is implemented on computing resources owned, accessible, and/or otherwise under the control of the computing resource service provider and is configurable to provide data to the indexing system 122.

In an embodiment, one or more of the nodes are communicatively coupled to one or more other of the nodes. Such communicative coupling can include one or more of wired or wireless communication. In the embodiment, the nodes each maintain at least a portion of a ledger of all transactions in the blockchain. In this manner, the ledger is a distributed ledger. A transaction processed by a node that affects the ledger is verifiable by one or more of the other nodes such that the integrity of the ledger is maintained.

In an embodiment, at least some of the nodes are miner nodes that perform complex calculations, such as solving cryptographic problems. A miner node that solves the cryptographic problem creates a new block for the blockchain and broadcasts the new block to others of the nodes. The others of the nodes verify the work of the miner node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block becomes linked to a previous block, thereby creating the "chain" that links the blocks in the blockchain. In embodiments, valid blocks are added to the blockchain by a consensus of the nodes. Also in some examples, a blockchain comprises a list of validated blocks.

In an embodiment, at least some of the nodes operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, a "spending transaction" refers to a transaction that reassociates (e.g., transferring ownership or control) at least a portion of a digital asset, indicated by an unspent transaction output (UTXO) of a previous transaction, to an entity associated with a blockchain address. In some examples, a "previous transaction" refers to a transaction that contains the UTXO being referenced by the spending transaction. In some embodiments, the transaction includes a "locking script" that encumbers the transaction with conditions that must be fulfilled before ownership/control can be transferred ("unlocked"). In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. Validation of transactions may involve validating one or more conditions specified in a locking script and/or unlocking script. Upon successful validation of the transaction, the validation node adds the transaction to the blockchain and distributes it to the nodes.

Figure 2:
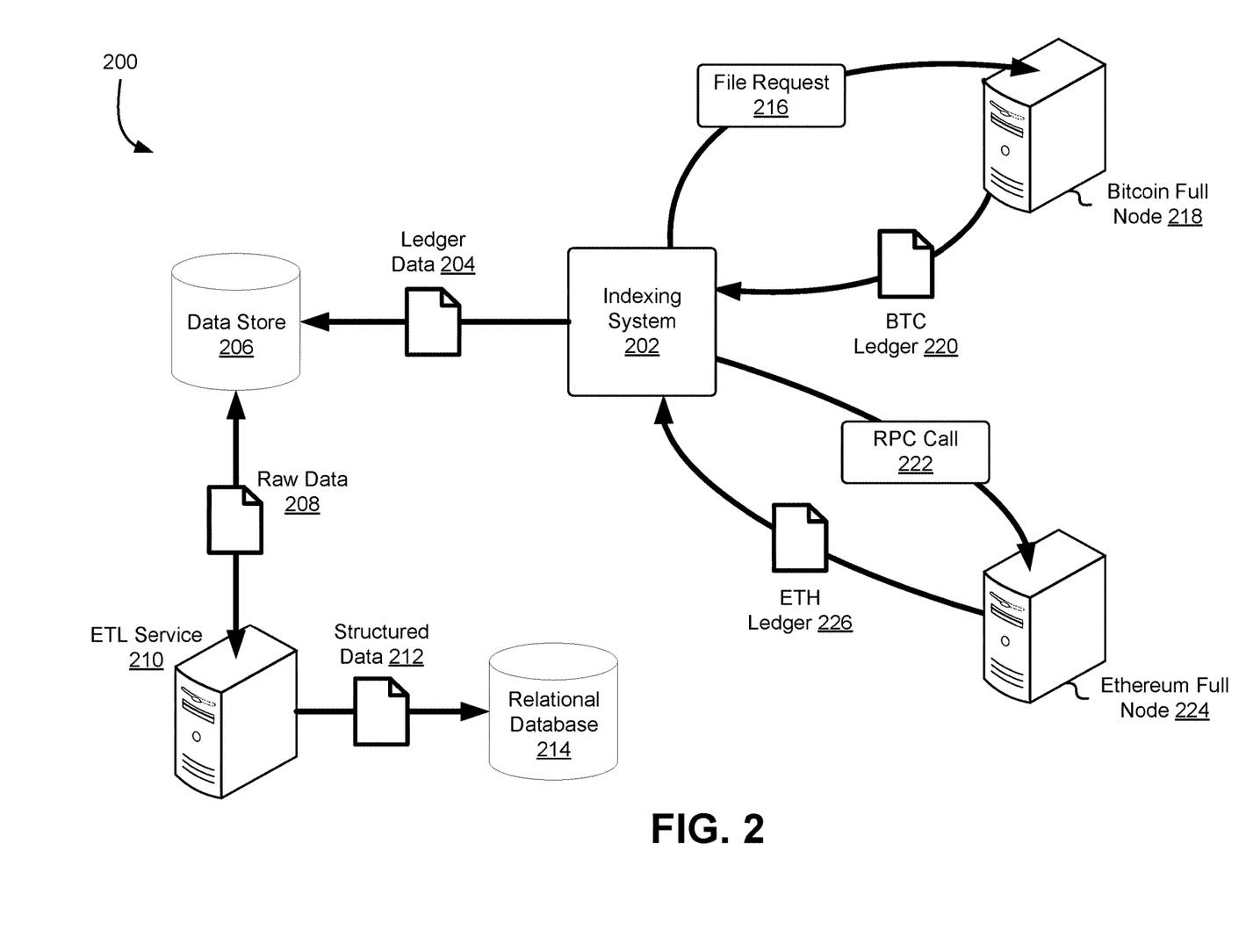
FIG. 2 illustrates an example of a computing environment in which an indexing system is implement, in accordance with at least one embodiment.

FIG. 2 illustrates an example of a computing environment 200 in which an indexing system 202 is implemented, in accordance with at least one embodiment. The indexing system 202 may be utilized in connection with embodiments described in connection with FIGS. 1 and 3. The computing environment 200 may be used to implement a system that supports access to various blockchains and blockchain protocols.

The indexing system 202, in an embodiment, is implemented using computer hardware, software, or a combination thereof that obtains ledger data 204 from a data source (e.g., a blockchain ledger) and stores the ledge data in a data store 206. Data from the data store (e.g., raw data 208 obtained from and formatted according to a blockchain protocol) may be processed by an extract, transform, and load (ETL) service 210 to obtain structured data 212 that is stored in a relational database 214. Data may be retrieved from the relational database 214 to fulfill subsequent requests.

The indexing system 202, in an embodiment, is configured to obtain data from multiple blockchains and the ETL service 210 is configured to convert data from various raw formats (e.g., raw BTC data or raw ETH data) to a uniform format for storage in the relational database 214. For example, the indexing system 202 may submit a file request 216 to the Bitcoin full node 218 to obtain BTC ledger 220 data, whereas for the Ethereum network, the indexing system 202 may submit a remote procedure call (RPC) API call 222 to an Ethereum full node 224 requesting the ETH ledger 226 data.

In various embodiments, the indexing system 202 is a computer system of a computing resource service provider that interfaces with multiple types of blockchain networks to obtain ledger data and stores the ledger data in a data storage system where it can later be retrieved, processed, and stored in a structured format. The indexing system 202, in an embodiment, includes executable code that, as a result of execution by one or more processors, causes the one or more processors to determine, for a blockchain protocol, one or more operations to perform to obtain ledger data according to the blockchain protocol. In an embodiment, the indexing system has separate routines (e.g., software modules) that are each configured to access data from a respective blockchain protocol. The indexing system 202 may be implemented according to the computer systems described in connection with FIG. 5.

For example, a BTC routine may have executable code that, if invoked, causes the indexing system 202 to submit a file request 216 to a Bitcoin full node 218 running within the computing resource service provider. The file request 216, in an embodiment, is a request to the Bitcoin full node 218 to transfer a copy of the Bitcoin ledger data to the indexing system 202. In an embodiment, the file request specifies a particular data file (e.g., blk00000.dat), all Bitcoin block data files, or a portion thereof. Generally speaking, for a Bitcoin-based implementation, the ledger data is received as files labeled as "blk*.dat" wherein the asterisk is a wildcard that refers to the successive blocks of blockchain. For example, blk00000.dat, may refer to the genesis block. The indexing system 202 may receive the BTC ledger 220 data (e.g., one or more "blk*.dat" files) and store the files in the data store 206. In an embodiment, the Bitcoin full node 218 illustrated in FIG. 2 is a full node connected to the Bitcoin network that is accessible, operated, or can otherwise be controlled by the computing resource service provider. The Bitcoin full node 218 may be the local node described in connection with FIG. 1. In an embodiment, the Bitcoin full node 218 is a hardware computer server under the control of the computing resource service provider that runs a full node of the Bitcoin network and includes executable code that allows it to fulfill file requests from the indexing system 202. In an embodiment, the file request 216 is made to a private endpoint of a local node that is accessible to Intranet computing resources of the computing resource service provider. In an embodiment, the file request 216 is an authenticated request that the Bitcoin full node 218 receives, verifies is authentic (e.g., by verifying the validity of a digital signature on the request), and provides a response with the BTC ledger 220 as a result of verifying that the digital signature is valid. In an embodiment, authenticated encryption is used to make the file request. In an embodiment, the response to the file request does not include the entire ledger, but instead, returns a network address where the ledger data may be accessed. Various techniques described in connection with this example routine for obtaining ledger data from a blockchain may be utilized in connection with obtaining ledger data from other blockchains.

As a second example, the indexing system 202 may invoke an ETH routine that, if invoked, causes the indexing system 202 to obtain ledger data for the Ethereum blockchain. In an embodiment, the indexing system 202 identifies the chain to access (e.g., Ethereum blockchain), selects an ETH adapter which includes executable code that, as a result of execution on one or more processors, makes a RPC call 222 to the Ethereum full node 224 wherein the RPC call is a request for data, and the Ethereum full node 224 receives the request and provides the Ethereum blockchain (or a portion thereof) in response to the request. As can be appreciated by one of ordinary skill in the art, the indexing system 202 can be utilized to perform different operations to obtain ledger data from different blockchains, wherein the ledger data for various blockchains may be in different formats.

As a third example, the indexing system 202 may include native support for a blockchain. For example, for third blockchain (not illustrated in FIG. 2), the indexing system 202 may have native APIs that allow the indexing system to directly access the ledger data. Continuing with the example, the indexing system 202, in an embodiment, submits an internal request to a data storage service or blockchain service of the computing resource service provider and obtains the ledger data directly. The ledger data, in various embodiments, is stored in a structured format and obtained from a database (e.g., the relational database 214 illustrated in FIG. 2)—accordingly, in such an embodiment, there is not a need for the indexing system 202 and ETL service 210 to convert the ledger data for such a blockchain from a raw format to a structured format, as the data is natively stored in the structured format. In an embodiment, there is derived data generated by the indexing system 202 and/or ETL service 210 and stored to the relational database to facilitate certain functionality, such as searching, filtering, and aggregating data according to a view on the derived data.

In an embodiment, the indexing system 202 obtains ledger data 206 according to any suitable blockchain protocol including, but not limited to, Bitcoin, Ethereum, ArcBlock, and more. The ledger data 204 illustrated in FIG. 2, in an embodiment, is formatted according to any blockchain protocol supported by the indexing system 202—for example, the ledger data 204 may be according to the Bitcoin protocol, Ethereum protocol, or others. In an embodiment, regardless of the protocol, the indexing system 202 stores the ledger data 204 in a data store 206. The data store 206, in an embodiment, is any suitable data storage system. In an embodiment, the data store 206 is a data storage service operated and/or controlled by the computing resource service provider. The data store 206, in an embodiment, is a data storage service of a third-party organization that stores data on behalf of the computing resource service provider. In an embodiment, the data store 206 is organized to store data as objects organized within containers.

In an embodiment, the extract, transform, and load (ETL) service 210 is a service utilized by the computing resource service provider that maps raw data 208 in various formats (e.g., raw data formatted according to Bitcoin protocol, Ethereum protocol, and more) to a format for structured data 212. For example, blockchain data from BTC and ETH—which are encoded in different formats—may be decomposed and used to populate a data structure that includes various common aspects of the blockchains, such as block-level metadata, transaction-level metadata, and more. In an embodiment, the ETL service 210 generates the data structure from the raw data 208 (e.g., raw data according to any of a plurality of supported blockchain protocols) and stores the data in a database. In an embodiment, custom or blockchain specific fields may be stored in the database as a custom property as a serialized data stream that can be de-serialized and interpreted by the respective adapter for that specific blockchain.

In an embodiment, the structured data 212 refers to the common format that the ETL service 210 converts various types of blockchain data into. The structured data 212, in an embodiment, maps onto tables, rows, and columns of the relational database 214.

In an embodiment, the relational database 214 refers to a database server or a portion thereof, and may be implemented in accordance with databases (e.g., database management systems) described in accordance with various embodiments discussed in connection with FIG. 1. In an embodiment, the structured data 212 is stored in database tables organized into rows and columns which are indexed according to the access patterns and/or APIs supported by an interface of the computing resource service provider used to access data of the relational database. In an embodiment, the structured data 212 is native data as described in connection with FIG. 1.

In an embodiment, the relational database 214 supports various types of queries that can be utilized to fulfill chain-agnostic requests. For example, a chain-agnostic request may request a list of all transaction from a first user to a second over the past N days. In an embodiment, the request may perform a query of a TxInputs table to obtain all transaction inputs that the first user has made and a query of a TxOutputs table to obtain all transaction outputs that the second user has received, and then perform a join to determine all transaction payments from the first user to the second user. Continuing with the example, a Transaction table is queried to further filter those payments based on the time the payment was made, so that only payments within the past N days (as specified in the example request) are returned to the requestor.

Figure 3:
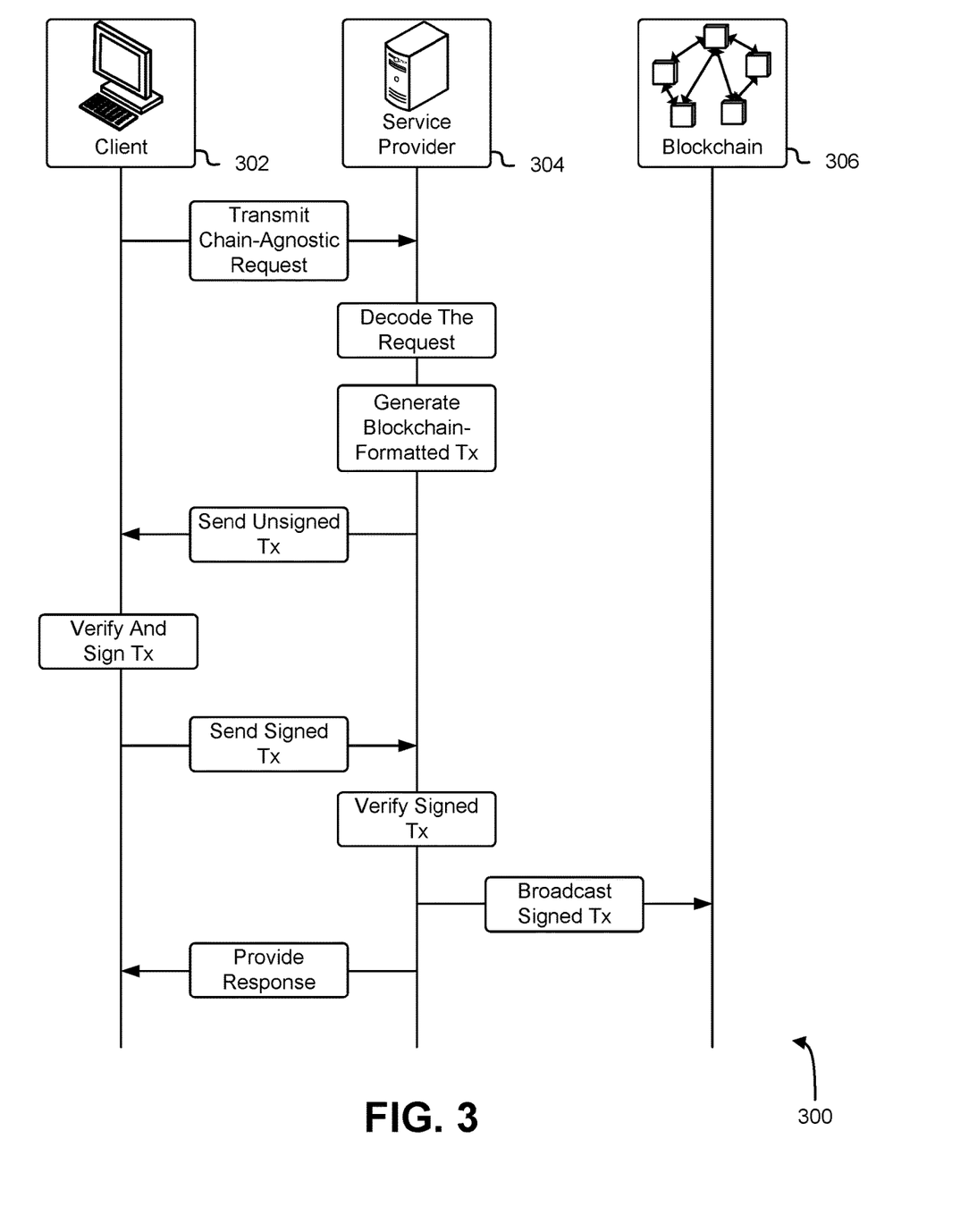
FIG. 3 illustrates a diagram of fulfillment of a chain-agnostic request, in accordance with at least one embodiment.

FIG. 3 illustrates a diagram 300 of fulfillment of a chain-agnostic request, in accordance with at least one embodiment. While FIG. 3 illustrates an example of fulfilling a chain-agnostic request to broadcast a transaction, there are various other types of requests that can be processed using techniques and principles described in connection with this figure as well as other figures of this disclosure. FIG. 3 illustrates the coordination of a client computer system 302, a computing resource service provider 304, and a blockchain network 306 for broadcasting a transaction using various techniques as described in greater detail hereinbelow. Systems and techniques described in connection with other figures may, in some cases, be utilized in connection with FIG. 3.

In an embodiment, the client 302 is a client computer system implemented in accordance with those described in connection with FIG. 1. In an embodiment, the client computer system 302 has a client-server relationship with the computing resource service provider 304 and submits a chain-agnostic request to the service provider. The chain-agnostic request can be various types of requests that are supported according to an interface. In an embodiment, the client transmits a chain-agnostic request to the service provider that encodes a command to make a payment from the client's wallet (specifying a particular blockchain) to another user.

In an embodiment, the chain-agnostic request is received by the computing resource service provider 304 and decoded. Decoding the request may refer to obtaining a request in a query language and determining how the request can be fulfilled according to the protocol of a blockchain specified in the request. For example, a chain-agnostic request may be interoperable between multiple blockchain protocols in the sense that the request may be received in a common format between multiple formats and then decoded and fulfilled using a respective chain adapter. For example, a chain-agnostic request is received in a common format and specifies a Bitcoin network to generate a payment transaction. The service provider may, for this example, generate a transaction according to the Bitcoin-protocol and generate a Transaction input with a payment amount corresponding to the payment amount specified in the chain-agnostic request. The payment amount in the chain-agnostic request may be specified in a generic currency (e.g., US dollars) and is converted to a blockchain-specific quantity (e.g., Satoshis) by the service provider and/or a Bitcoin adapter.

The service provider, therefore, may generate a blockchain-formatted transaction that is unsigned. In an embodiment, the transaction input is unsigned at least because the service provider does not have access to the private key associated with the client's account. The service provider 304, in such an embodiment, transmits the unsigned transaction to the client 302 and the client verifies the unsigned transaction is correct, such as by verifying the payment amount is correct, that the payment is locked to the correct address, etc. In an embodiment, the client verification includes verifying the authenticity and/or integrity of the unsigned transaction sent by the service provider 304 to the client 302. Upon verifying the unsigned transaction, the client 302 may use a private key to sign the transaction input and provide it to the service provider.

The service provider 304, upon receiving the signed transaction, verifies the signed transaction, for example, by using the public key associated with the client's Bitcoin address to verify the digital signature provided by the client. The transaction may then be broadcast to the blockchain network 306, thereby broadcasting the payment to the blockchain network (e.g., Bitcoin) whereby the payment is finalized when the transaction is confirmed. In an embodiment, the service provider 304 provides a response to the client 302. The response may be provided as a result of the transaction being broadcast to the blockchain network, being confirmed to the blockchain network, or based on various other indications that the client may be subscribed to. The request may be used to signal the success or failure of various steps that are performed to fulfill the chain-agnostic request.

Figure 4:
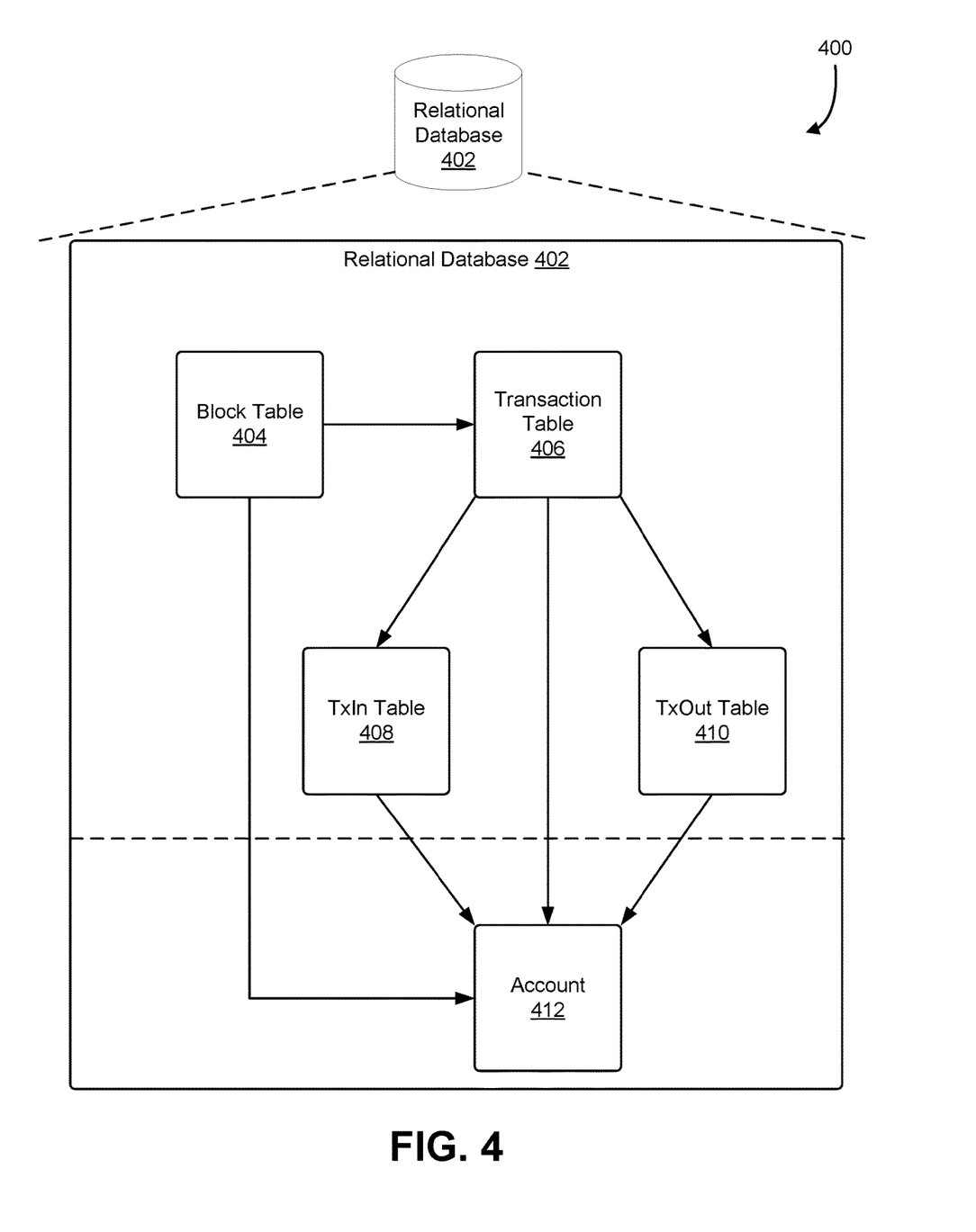
FIG. 4 illustrates an example of a relational database implemented in accordance with at least one embodiment.

FIG. 4 illustrates a computing environment 400 in which various embodiments may be implemented. The computing environment 400 includes a relational database 402 that may be utilized in connection with various embodiments, such as those described in connection with FIGS. 1 and 2. The relational database 402 illustrated in FIG. 4, in an embodiment, refers to a format for storing structured data that is—directly or indirectly—obtained from ledger data according to a blockchain protocol. The database schemas illustrated in FIG. 4 are merely illustrative examples of how ledger data from a chain can be structured and organized and stored within a relational database 402.

In an embodiment, the block table 404 refers to a database table that includes block header information and can be used to associate the block to a set of transactions. In an embodiment, the block table for a blockchain (e.g., Bitcoin) includes at least the following columns (or properties):

| Property Name | Description |
| --- | --- |
| Height | Block height (primary key) |
| Size | Block size |
| Version | Blockchain version |
| Hash | Hash of current block |

| Property Name | Description |
| --- | --- |
| Prev_Hash | Hash of previous block |
| Merkle_Tree | Generated from transactions in the block |
| Merkle_Root | Digital fingerprint of transactions in the block |
| Timestamp | Block timestamp |
| Difficulty | Measurement of the difficulty to mine a result |
| Nonce | Used to vary input |
| Number_Txs | Number of transactions in the block |
| Total | Total number of Bitcoins transacted in the block |
| Fees | Total fees paid in transactions of the block | additionally, there may be one or indexes built on properties of the table, such as an index on the block height and an index on the hash.

As a second example, the transaction table may include various transaction-level properties, including an identifier that binds the transaction to a particular block:

| Property Name | Description |
| --- | --- |
| Id | Primary key |
| Block_Height | Height of the block that includes the transaction |
| Block_Hash | Hash of the block that includes the transaction |
| Hash | Transaction hash |
| Witness_Hash | |
| Index | |
| Version | |
| Number_Inputs | |
| Number_Outputs | |
| Lock_Time | Optional parameter that indicates when a transaction can be accepted into a block |
| Weight | |
| Total | Total value of the transaction |
| Fees | Fees paid in the transaction |

Likewise, the transaction input table may include various properties related to transaction inputs such as:

| Property Name | Description |
| --- | --- |
| Id | Primary key |
| Block_Height | Height of the block that includes the transaction |
| Block_Hash | Hash of the block that includes the transaction |
| Tx_Hash | Hash of the transaction |
| Tx_Index | |
| Index | |
| Prev_Tx | |
| Prev_Output | |
| Value | Value of the input (e.g., in Satoshis) |
| Script | Locking script |
| Script_Type | |
| Sequence | Used for time-locked transactions |
| Account | Foreign key reference to account table |

And the transaction output table may include various properties related to transaction outputs such as:

| Property Name | Description |
| --- | --- |
| Id | Primary key |
| Block_Height | Height of the block that includes the transaction |
| Block_Hash | Hash of the block that includes the transaction |
| Tx_Hash | |
| Tx_Index | |
| Index | |
| Value | |
| Script | Unlocking script |
| Script_Type | |
| Account | |

The block table 404, transaction table 406, transaction input table 408 and transaction output table 410, in an embodiment, includes data that is sufficient to reconstruct the blockchain ledger according to the blockchain protocol—for example, the Bitcoin ledger files "blk*.dat" can, in an embodiment, be completely reconstructed solely from these four tables. These tables 404-410 (or portions thereof) may be native data, as described in accordance with various embodiments, such as those discussed in connection with FIG. 1. It should be noted that among the various tables described above, some values of the tables may be determined based on calculations of the ledger data, such as the total value of a transaction, or the total value of a block—while these values may not be explicitly encoded in the block data for Bitcoin, they can be calculated from the ledger data.

The dotted line illustrated in FIG. 4 illustrates that various tables 404-410 or portions thereof are determined directly from ledger data—e.g., the tables 404-410, or portions thereof, are considered native data, as described in connection with FIG. 1. In an embodiment, an extract, transform, and load (ETL) service 210 maps data from a blockchain ledger to a corresponding record and property of the relational database 402 in a one-to-one (injective) mathematical relationship. The accounts table 412 may include derived data such as a user's wallet balance. In an embodiment, the accounts table 412 includes information that is not a specific blockchain, such as information that is associated with the user's identity that is used by the computing resource service provider (or a component therein) to authenticate a requestor. In an embodiment, the account table includes a mapping of the user's identity in the computing resource service provider to one or more addresses (e.g., blockchain addresses for one or more blockchains supported by the computing resource service provider). Accordingly, the account table 412 can include aggregated information about a particular user across multiple blockchain networks, such as the user's total balance across multiple blockchains.

Note that one or more of the operations performed in the processes described above may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 5:
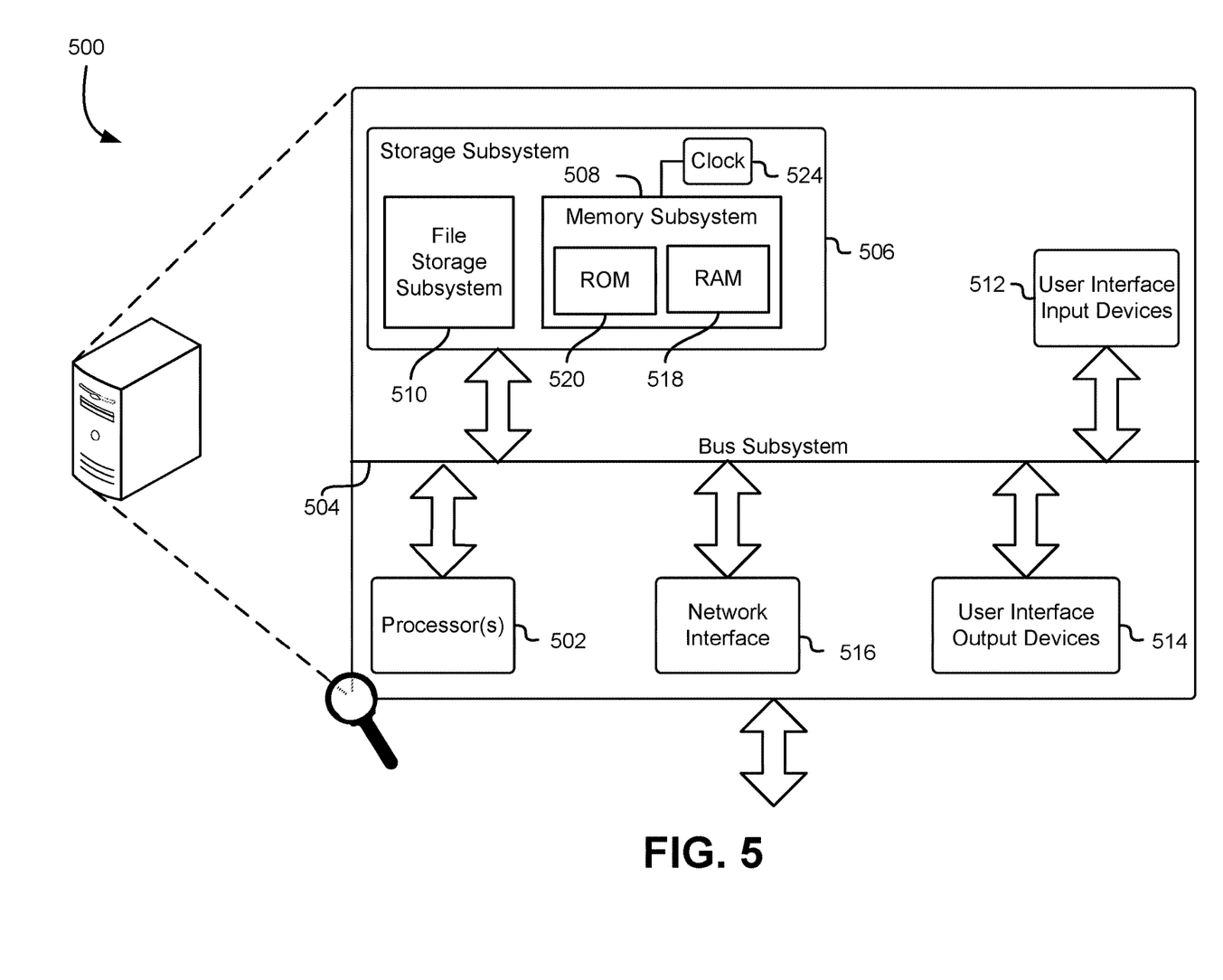
FIG. 5 illustrates an environment in which various embodiments can be implemented.

FIG. 5 is an illustrative, simplified block diagram of a computing device 500 that can be used to practice at least one embodiment of the present disclosure. In various embodiments, the computing device 500 may be used to implement any of the systems illustrated and described above. For example, the computing device 500 may be configured for use as a data server, a web server, a portable computing device, a personal computer, or any electronic computing device. As shown in FIG. 5, the computing device 500 may include one or more processors 502 that, in embodiments, communicate with and are operatively coupled to a number of peripheral subsystems via a bus subsystem. In some embodiments, these peripheral subsystems include a storage subsystem 506, comprising a memory subsystem 508 and a file/disk storage subsystem 510, one or more user interface input devices 512, one or more user interface output devices 514, and a network interface subsystem 516. Such storage subsystem 506 may be used for temporary or long-term storage of information.

In some embodiments, the bus subsystem 504 may provide a mechanism for enabling the various components and subsystems of computing device 500 to communicate with each other as intended. Although the bus subsystem 504 is shown schematically as a single bus, alternative embodiments of the bus subsystem utilize multiple buses. The network interface subsystem 516 may provide an interface to other computing devices and networks. The network interface subsystem 516 may serve as an interface for receiving data from and transmitting data to other systems from the computing device 500. In some embodiments, the bus subsystem 504 is utilized for communicating data such as details, search terms, and so on.

In some embodiments, the user interface input devices 512 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 500. In some embodiments, the one or more user interface output devices 514 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 500. The one or more user interface output devices 514 can be used, for example, to present user interfaces to facilitate user interaction with applications performing processes described and variations therein, when such interaction may be appropriate.

In some embodiments, the storage subsystem 506 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 506. These application modules or instructions can be executed by the one or more processors 502. In various embodiments, the storage subsystem 506 additionally provides a repository for storing data used in accordance with the present disclosure. In some embodiments, the storage subsystem 506 comprises a memory subsystem 508 and a file/disk storage subsystem 510.

In embodiments, the memory subsystem 508 includes a number of memories, such as a main random access memory (RAM) 518 for storage of instructions and data during program execution and/or a read only memory (ROM) 520, in which fixed instructions can be stored. In some embodiments, the file/disk storage subsystem 510 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 500 includes at least one local clock 524. The at least one local clock 524, in some embodiments, is a counter that represents the number of ticks that have transpired from a particular starting date and, in some embodiments, is located integrally within the computing device 500. In various embodiments, the at least one local clock 524 is used to synchronize data transfers in the processors for the computing device 500 and the subsystems included therein at specific clock pulses and can be used to coordinate synchronous operations between the computing device 500 and other systems in a data center. In another embodiment, the local clock is a programmable interval timer.

The computing device 500 could be of any of a variety of types, including a portable computer device, tablet computer, a workstation, or any other device described below. Additionally, the computing device 500 can include another device that, in some embodiments, can be connected to the computing device 500 through one or more ports (e.g., USB, a headphone jack, Lightning connector, etc.). In embodiments, such a device includes a port that accepts a fiber-optic connector. Accordingly, in some embodiments, this device is that converts optical signals to electrical signals that are transmitted through the port connecting the device to the computing device 500 for processing. Due to the ever-changing nature of computers and networks, the description of the computing device 500 depicted in FIG. 5 is intended only as a specific example for purposes of illustrating the preferred embodiment of the device. Many other configurations having more or fewer components than the system depicted in FIG. 5 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
receiving, at a service provider and from an off-chain application running on a client computer system, a first chain-agnostic request encoded in a format that is interoperable between a plurality of blockchain protocols, the first chain-agnostic request comprising a first parameter indicating a first blockchain protocol of the plurality of blockchain protocols, the first chain-agnostic requesting to modify a first state of a first blockchain network;
selecting, at the service provider and responsive to the first chain-agnostic request by the off-chain application, a first off-chain chain adapter from a plurality of off-chain chain adapters that is compatible with the first chain-agnostic request based on the first parameter indicating the first blockchain protocol;
causing the first off-chain chain adapter to perform, based on the first chain-agnostic request, one or more operations to obtain access to first ledger data of the first blockchain network according to the first blockchain protocol;
parsing the first ledger data to determine, based on the first blockchain protocol, first structured data;
storing the first structured data in a database;
fulfilling the first chain-agnostic request based on successfully storing the first structured data by at least:
determining, based on the first structured data, a plurality of unspent transaction outputs (UTXOs) associated with the off-chain application;
generating a first unsigned transaction that encodes a transfer of one or more of the UTXOs according to the first state;
providing the first unsigned transaction to the off-chain application;
receiving, from the off-chain application, a first signed transaction, wherein the first signed transaction is generated based on the first unsigned transaction and a first private key associated with the off-chain application; and
broadcasting the first signed transaction to the first blockchain network;
receiving, from the off-chain application, a second chain-agnostic request encoded in the format that is interoperable between the plurality of blockchain protocols, the second chain-agnostic request comprising a second parameter indicating a second blockchain protocol of the plurality of blockchain protocols, the second chain-agnostic requesting to modify a second state of a second blockchain network;
selecting, at the service provider and responsive to the second chain-agnostic request by the off-chain application a second off-chain chain adapter from the plurality of off-chain chain adapters that is compatible with the second chain-agnostic request based on the second parameter indicating the second blockchain protocol;
causing the second off-chain chain adapter of the plurality of off-chain chain adapters to perform different one or more operations to obtain access to a second ledger data of the second blockchain network according to the second blockchain protocol;
parsing the second ledger data to determine, based on the second blockchain protocol, a second structured data;
storing the second structured data in the database; and fulfilling the second chain-agnostic request based on successfully storing the second structured data by at least:
   determining, based on the second structured data, an amount of digital assets under the requestor's control;
   generating a second unsigned transaction that encodes a transfer of at least a portion of the amount of digital assets under the requestor's control according to the second state;
   providing the second unsigned transaction to the off-chain application;
   receiving, from the off-chain application, a second signed transaction, wherein the second signed transaction is generated based on the second unsigned transaction and a second private key associated with the off-chain application; and
   broadcasting the second signed transaction to the second blockchain network.

2. The method of claim 1, wherein causing the first chain adapter to perform the one or more operations to obtain access to the first ledger data comprises causing the first chain adapter to submit a remote procedure call to a node of the first blockchain network to obtain the first ledger data.

3. The method of claim 2, wherein the first blockchain network is Bitcoin-based blockchain and the second blockchain network is an Ethereum-based blockchain.

4. The method of claim 1, parsing the first ledger data comprises:
   extracting at least a portion of the first ledger data;
   determining a mapping, based on the first blockchain protocol, the at least portion of the first ledger data to one or more properties of a table of the database; and
   constructing the first structured data based on the at least portion of the first ledger data and the mapping.

5. The method of claim 1, wherein the first chain-agnostic request is encoded as a GraphQL query.

6. The method of claim 1, wherein:
   the first structured data is stored in a first table of the database; and
   the method further comprises:
      generating, based on the first structured data stored in the first table, derived data in a second table of the database; and
      storing at least a portion of the second table in a dictionary server.

7. A system, comprising:
one or more processors; and
memory storing a set of instructions that, as a result of execution by the one or more processors, cause the system to:
   receive, at a service provider and from an off-chain application running on a client computer system, a first chain-agnostic request encoded in a format that is interoperable between a plurality of blockchain protocols, the first chain-agnostic request comprising a first parameter indicating a first blockchain protocol of the plurality of blockchain protocols, the first chain-agnostic requesting to modify a first state of a first blockchain network;
   select, at the service provider and responsive to the first chain-agnostic request by the off-chain application, a first off-chain chain adapter from a plurality of off-chain chain adapters that is compatible with the first chain-agnostic request based on the first parameter indicating the first blockchain protocol;
   cause the first off-chain chain adapter to perform, based on the first chain-agnostic request, one or more operations to obtain access to first ledger data of the first blockchain network according to the first blockchain protocol;
   parse the first ledger data to determine, based on the first blockchain protocol, first structured data;
   store the first structured data in a database;
   fulfill the first chain-agnostic request based on successfully storing the first structured data by at least:
      determining, based on the first structured data, a plurality of unspent transaction outputs (UTXOs) associated with the the off-chain application;
      generating a first unsigned transaction that encodes a transfer of one or more of the UTXOs according to the first state;
      providing the first unsigned transaction to the the off-chain application;
      receiving, from the the off-chain application, a first signed transaction, wherein the first signed transaction is generated based on the first unsigned transaction and a first private key associated with the the off-chain application; and
      broadcasting the first signed transaction to the first blockchain network;
   receive, at the service provider and from the the off-chain application, a second chain-agnostic request encoded in the format that is interoperable between the plurality of blockchain protocols, the second chain-agnostic request comprising a second parameter indicating a second blockchain protocol of the plurality of blockchain protocols, the second chain-agnostic requesting to modify a second state of a second blockchain network;
   select, at the service provider and responsive to the second chain-agnostic request by the off-chain application a second off-chain chain adapter from the plurality of off-chain chain adapters that is compatible with the second chain-agnostic request based on the second parameter indicating the second blockchain protocol;
   cause the second off-chain chain adapter of the plurality of off-chain chain adapters to perform different one or more operations to obtain access to a second ledger data of the second blockchain network according to the second blockchain protocol;
   parse the second ledger data to determine, based on the second blockchain protocol, a second structured data;
   store the second structured data in the database; and
   fulfill the second chain-agnostic request based on successfully storing the second structured data by at least:
      determining, based on the second structured data, an amount of digital assets under the requestor's control;
      generating a second unsigned transaction that encodes a transfer of at least a portion of the amount of digital assets under the requestor's control;
      providing the second unsigned transaction to the off-chain application;
      receiving, from the off-chain application, a second signed transaction, wherein the second signed transaction is generated based on the second unsigned transaction and a second private key associated with the off-chain application; and
      broadcasting the second signed transaction to the second blockchain network.

8. The system of claim 7, wherein the instructions to cause the first chain adapter to perform the one or more operations to obtain access to the first ledger data comprise instructions that, as a result of execution by the one or more processors, cause the system to submit a command to a different system to access the first ledger data.

9. The system of claim 7, wherein the first blockchain network is a Bitcoin-based blockchain network.

10. The system of claim 7, wherein the instructions to parse the first ledger data to determine, based on the first blockchain protocol, the first structured data comprise instructions that, as a result of execution by the one or more processors, cause the system to:
 extract at least a portion of the first ledger data;
 determine a mapping, based on the first blockchain protocol, the at least portion of the first ledger data to one or more properties of a table of the database; and
 construct the first structured data based on the at least portion of the first ledger data and the mapping.

11. The system of claim 7, wherein the first chain-agnostic request is encoded in a structured language format.

12. The system of claim 7, wherein:
 the instructions to store the first structured data in the database comprise instructions that, as a result of execution by the one or more processors, cause the system to store the structured data in a first table of the database; and
 the set of instructions further comprises instructions that, as a result of execution by the one or more processors, causes the system to:
  generate, based on the first structured data stored in the first table, derived data in a second table of the database; and
  store at least a portion of the second table in a dictionary server.

* * * * *